United States Patent
Weiss (10) Patent No.: US 8,196,102 B2
(45) Date of Patent: Jun. 5, 2012

(54) SOFTWARE SUPPORTABILITY CERTIFICATION

(75) Inventor: Bernhard Weiss, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1261 days.

(21) Appl. No.: 11/870,997

(22) Filed: Oct. 11, 2007

(65) Prior Publication Data
US 2009/0100411 A1 Apr. 16, 2009

(51) Int. Cl.
*G06F 9/44* (2006.01)
(52) U.S. Cl. .................................. 717/121; 717/124
(58) Field of Classification Search ............ 717/120–135
See application file for complete search history.

(56) References Cited

U.S. PATENT DOCUMENTS
2005/0283623 A1* 12/2005 Vanderheyden et al. ..... 713/193

OTHER PUBLICATIONS

Morris et al., "Software Component Certification", 2001, IEEE, pp. 30-36.*
Ma et al., "Framework for Third Party Testing of Component Software", 2001, IEEE, pp. 431-434.*

* cited by examiner

*Primary Examiner* — Ted T Vo
(74) *Attorney, Agent, or Firm* — Brake Hughes Bellermann LLP (57) ABSTRACT

A method for certifying a software product for supportability is disclosed in which the software product is identified, wherein the software product is configured to receive and process one or more user interactions. One or more anticipated log messages corresponding to each of a plurality of predetermined user errors which the software product is anticipated to generate on a logging framework associated with supporting the software product are identified. It is required that the software product perform each of the plurality of predetermined user errors responsive to the one or more user interactions. It is determined that the software product generates, for each of the plurality of predetermined user errors, one or more log messages on the logging framework, and the software product is certified for supportability based on a comparison of the anticipated log messages with the generated log messages.

20 Claims, 4 Drawing Sheets

| | | | LOGS AND TRACES | | | | |
|---|---|---|---|---|---|---|---|

SHOW [PREDEFINED VIEW ▽] [SAP LOGS ▽] [CLOSE FILTER]

SAP LOGS

[SET AS DEFAULT VIEW] [SAVE VIEW] [SAVE VIEW AS] [RESET VIEW] [DELETE VIEW]

416 — FILTER BY DATA SOURCE

< SELECT DATA SOURCE > ▽

[APPLY DATA SOURCES]

416 — FILTER BY CONTENT

✓ CATEGORY ▽ CONTAINS ▽ /APPLICATIONSUC4

< SELECT FILTER > ▽

[APPLY FILTERS]

[OPEN COLUMN CUSTOMIZATION] [OPEN RECORD DETAILS] [DOWNLOAD CONTENT] [OPEN SEARCH]          📎 RECORD

| | SEVERITY | DATE | TIME | MESSAGE | CATEGORY | LOCATION | APPLICATION |
|---|---|---|---|---|---|---|---|
| | ⓘ INFO | 2006-11-07 | 17:10:54:796 | U0029001 REPORT '1733019' ENDED NORMALLY | /APPLICATIONS/UC4 | COM.UC4.EX.JMX | UC4.COM/,MXEXECUTOR |
| | ⓘ INFO | 2006-11-07 | 17:10:54:765 | U0029001 REPORT '1733019' FOR FILE 'CAADUPGO.TXT' HAS BEEN STARTED | /APPLICATIONS/UC4 | COM.UC4.EX.JMX | UC4.COM/,MXEXECUTOR |
| | ⓘ INFO | 2006-11-07 | 17:10:54:656 | U2001026 JOB 'JOBS.JMX.N/V2004S' WITH RUN# '1733016' HAS BEEN REMOVED FROM THE JOB TABLE | /APPLICATIONS/UC4 | COM.UC4.EX.JMX | UC4.COM/,MXEXECUTOR |
| 402A | ⓧ ERROR | 2006-11-07 | 17:10:54:421 | U2000009 JOB 'JOBS.JMX.N/V2004S' WITH RUN# '1733016' ENDED WITH RETURN CODE '1' | /APPLICATIONS/UC4 | COM.UC4.EX.JMX | UC4.COM/,MXEXECUTOR |
| | ⓘ INFO | 2006-11-07 | 17:10:54:140 | U2000003 JOB 'JOBS.JMX.N/V2004S' WAS STARTED WITH RUN# '1733016' | /APPLICATIONS/UC4 | COM.UC4.EX.JMX | UC4.COM/,MXEXECUTOR |
| | ⓘ INFO | 2006-11-07 | 17:10:54:062 | LOOKUP:JMX | /APPLICATIONS/UC4 | COM.UC4.EX.JMX | UC4.COM/,MXEXECUTOR |
| | ⓘ INFO | 2006-11-07 | 17:10:53:999 | U2000005 START JOB 'JOBS.JMX.N/V2004S WITH RUN# '1733018' | /APPLICATIONS/UC4 | COM.UC4.EX.JMX | UC4.COM/,MXEXECUTOR |
| | ⓘ INFO | 2006-11-07 | 17:09:49:678 | U2000017 THE CHECK INTERVAL FOR 'REPORT' HAS BEEN SET TO '60' SECONDS | /APPLICATIONS/UC | COM.UC4.EX.JMX | UC4.COM/,MXEXECUTOR |
| | ⓘ INFO | 2006-11-07 | 17:09:49:678 | U2000017 THE CHECK INTERVAL FOR 'RECONNECT' HAS BEEN SET TO '20' SECONDS | /APPLICATIONS/UC4 | COM.UC4.EX.JMX | UC4.COM/,MXEXECUTOR |
| | ⓘ INFO | 2006-11-07 | 17:09:49:678 | U2000017 THE CHECK INTERVAL FOR 'SERVER' HAS BEEN SET TO '660' SECONDS | /APPLICATIONS/UC4 | COM.UC4.EX.JMX | UC4.COM/,MXEXECUTOR |

SOFTWARE SUPPORTABILITY CERTIFICATION

TECHNICAL FIELD

This description relates to the certification of software.

BACKGROUND

In the field of computer applications and technology there are many software developers developing many different software products. It may occasionally be the case that a first software developer may have developed (or may be developing) a first software product that the developer configures to interact with a second software product (developed by a second developer). However the second software product may be part of a larger software system wherein the first software product must properly interface with one or more components of the software system to be supported by the first software product.

In such situations, it may be beneficial to be able to test and certify a new software product before integrating it into an existing software product or system. For example, if it was known how the new software product was configured to react and/or interact with the existing system, it may be beneficial to determine whether or not the new software product actually does react and/or interact with the existing system as intended before allowing or certifying the new product for use with the existing system.

SUMMARY

According to an example embodiment, a method for certifying a software product for supportability is disclosed in which the software product is identified, wherein the software product is configured to receive and process user interactions. One or more anticipated log messages corresponding to each of a plurality of predetermined user errors are identified, where the software product is anticipated to generate the anticipated log messages on a logging framework associated with supporting the software product. It is required that the software product perform each of the plurality of predetermined user errors responsive to the one or more user interactions. It is determined that the software product generates, for each of the plurality of predetermined user errors, one or more log messages on the logging framework, and the software product is certified for supportability based on a comparison of the anticipated log messages with the generated log messages.

According to another example embodiment, a method for certifying a software product for product support includes determining that the software product is configured to generate log messages on a logging framework associated with providing the product support for the software product, where the log messages are based on one or more predetermined user errors and determining a correspondence level between the log messages generated during a use of the software product and the predetermined user errors generated during the use. A determination is made that the correspondence level is greater than or equal to a threshold correspondence level associated with the product support, and the software product is certified for the product support based on the determination that the correspondence level is greater than or equal to the threshold correspondence level.

According to another example embodiment a system for determining a supportability of a software product in conjunction with a host product is disclosed. The system includes a log engine configured to retrieve log messages generated by the software product on a logging framework associated with the host product, where the log messages are anticipated to correspond to one or more predetermined user errors determined by the software product. The system further includes an interface engine configured to determine the predetermined user errors associated with the software product, an evaluator configured to determine a correspondence level associated with the software product based on a level of correspondence between the predetermined user errors and the log messages, and a certification engine configured to determine the supportability of the software product based on a comparison of the correspondence level with a threshold correspondence level.

The details of one or more implementations are set forth in the accompanying drawings and the description below. Other features will be apparent from the description and drawings, and from the claims.

BRIEF DESCRIPTION OF THE DRAWINGS

FIG. 4 is a block diagram of an example logging framework of FIG. 1, according to an example embodiment.

DETAILED DESCRIPTION

Figure 1:
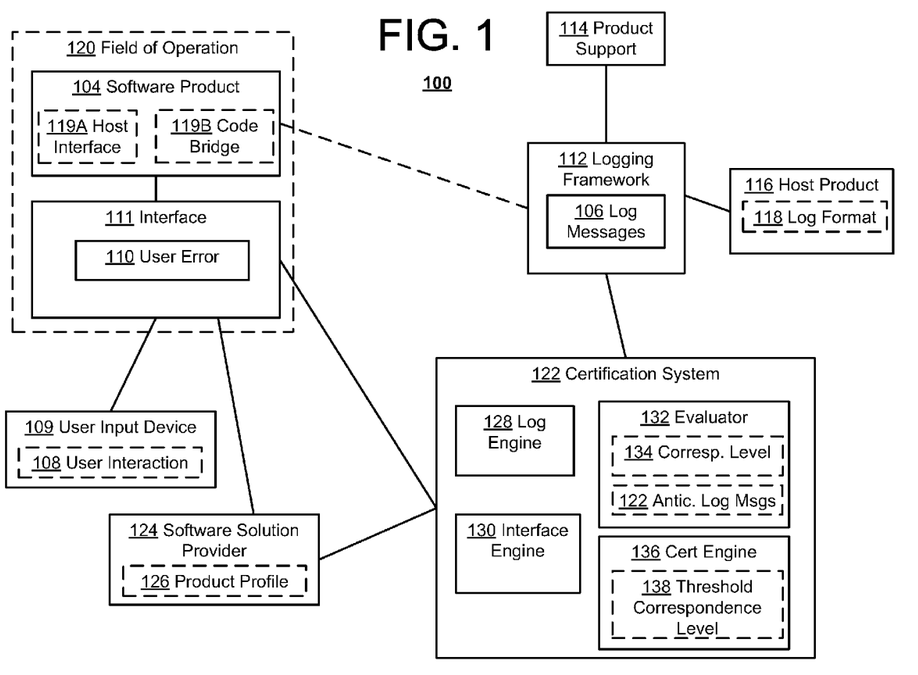
FIG. 1 is a block diagram of an example certification system, according to an example embodiment.

FIG. 1 is a block diagram of an example certification system 102, according to an example embodiment. In the example of FIG. 1, the certification system 102 may determine whether or not a software product 104 interacts with one or more components of a host system as expected. For example, the certification system 102 may determine whether the software product 104 interacts with the host system per one or more predetermined performance metrics associated with the interaction between the software product 104 and the host system. Then for example, based on the performance of the software product 104 per the performance metrics, the software product 104 may (or may not) be certified to operate with the host system.

According to an example embodiment, a third party may develop the software product 104 and configure it to work with the host system. However, prior to allowing or otherwise certifying the third-party software product 104 for operation on or with the host system, the certification system 102 may first certify the software product 104. For example, as referenced above, the certification may include a verification that the software product 104 interacts with the host system in conformance with the predetermined performance metrics.

One important performance metric for determining whether a third-party software product should be certified may be whether or not the software product 104 generates an acceptable error log on an error logging component of the host system in order to pass certification. For example, the host system may include a logging framework 112 for logging or otherwise storing one or more log messages (e.g., log messages 106) associated with a performance or operation of the host system. Then for example, the certification system 102 may certify the software product 104 for operation with the host system based on a capacity of the software product 104 to generate acceptable log messages (e.g., 106) on the logging framework 112.

The software product 104 may include any software application, program, product, code or other module or system configured to perform in an anticipated way or otherwise operate according to one or more standards. For example, the software product 104 can be a Java program within the Java Enterprise Edition (e.g., J2EE) operating environment. Then for example, the host system may include an application server (e.g., a J2EE application server) configured to provide the software product 104 to client computers or other devices. In other example embodiments, the software product 104 may be associated with other programming standards such as J2EE, Enterprise Java Beans (EJBs), web archives (WARs), servlets, server pages, filters, Javascript and/or SAP® Netweaver.

The log messages 106 may include one or more messages, notes, signals, records or other communications indicating a system event occurred. The log messages may be informative records produced or generated during run-time for analysis and/or troubleshooting of one or more system events. For example, when a user logs into the software product 104, the software product 104 may be configured to generate one or more informative log messages 106 recording information pertaining to the login, such as the name of the user, the time/date of login, and the location. In some implementations, there may be different types of log message 106, including for example, informative, warning, error and/or fatal log messages, wherein the type of log message 106 generated by the software product 104 may correspond to the severity and/or importance of the system event which occurred.

As referenced above, the log messages 106 may be generated on or otherwise provided to the logging framework 112. The logging framework 112 may include an application, product, program, or other system for recording and/or tracking errors or other events generated during one or more uses of the an application or product. For example, the logging framework 112 may be configured to receive error or other usage records (e.g., log messages 106) from the host system, including for example a host product 116. Then for example, for the software product 104 to be certified for operation with the host system, the certification system 102 may test the software product 104 performance with regard to the proper generation of log messages 106 on the logging framework 112.

The host product 116 may include any application, system, code, or other product configured to generate one or more log messages on the logging framework 112. For example, the host product 116 and logging framework 112 may be part of the host system, as referred to above, wherein the host product 116 generates log messages (e.g., log messages 106) in a log format 118 on the logging framework 112 responsive to one or more system events or errors.

As referenced above, in some implementations, the host product 116 may include or otherwise be associated with an application server, such as a J2EE application sever, an SAP® NetWeaver application server or another type of application server. According to an example embodiment, the host product 116 may include a customer relationship management (CRM) system, wherein the CRM system may log messages on the logging framework 106 corresponding to one or more messages provided to users of the CRM system. Then for example, the product support 114 may support the users of the CRM system (e.g., host product 116) who encounter the one or more messages, by referencing the logging framework 112.

The product support 114 may include a system, program or support team or mechanism for supporting the host product 116, including customer inquiries associated therewith. For example, a user or customer using the host product 116 may encounter one or more errors when using the host product 116. Then, for example, the user may contact the product support 114 for help resolving the one or more errors. In response, the product support 114 may reference the logging framework 112 to determine whether any log messages were created or generated by the host product 116 corresponding to the one or more errors. Then, based on the corresponding log messages, the product support 114 may help troubleshoot or otherwise determine the cause of the error(s) experienced by the user.

Thus, as referenced above, for the certification system 102 to certify the software product 104 for operation with the host product 116, it may determine that the software product 104 properly generates the log messages 106 on the logging framework 112, which are necessary for providing support services that are consistent with or required by support services available for the host product 116. For example, the certification system 102 may certify whether the log messages 106 actually generated by the software product 104 are in accordance with a log format 118 associated with the logging framework 112. This certification may better ensure that the product support 114 will be able to respond to any errors encountered by a user during the operation of the software product 104 as part of the host system (e.g., in association with the host product 116). For example, similar to how the product support 114 may reference the log messages on the logging framework 112 to respond to errors associated with the host product 116, the product support 114 may be able to respond to errors associated with the software product 104 by referencing the generated log messages 106 on the logging framework 112.

The log format 118 may include a format or style for the log messages 106. The log format 118 may include which fields and/or information should be included in one or more of the log messages 118. For example, the log format 118 may include a severity field, a date field, a time field, a user field, a message field, a category field, a location field, an application field and/or one or more additional or different fields. Then, for example, the log messages 106 can include information corresponding to one or more of the fields of the log format 118.

According to an example embodiment, the log messages 106 may record or otherwise provide information associated with the occurrence of errors or other program faults during one or more operations of the software product 104. For example, the log messages 106 may record when a user fails to log in due to an invalid user name and/or password. Or for example, the log messages 106 may record one or more determined user interaction(s) 108, including the responses thereto by the software product 104, by a user.

The user interaction(s) 108 may include any interaction, or combination of interactions, with the software product 104. The user interaction(s) 108 may, for example, generate or otherwise cause a system event within the software product 104, such as a user error 110. The user interaction(s) 108 may include any interaction, such as a keyboard press, mouse click, stylus or joystick movement or any other interaction, or combination of interaction(s) thereof.

The user error 110 may include one or more indications that a system event has occurred within the software product 104. For example, the user error 110 may include one or more messages, notes, signals, audio or other communication provided by the software product 104 responsive to one or more of the user interaction(s) 108. According to an example embodiment, the user error 110 may include a pop-up box displayed on an interface 111 associated with the software product 104, or for example, the user error 110 may include a sound or other audio or tone played upon an occurrence and/or processing of the user interaction 108.

According to an example embodiment, the user error 110 may include a predetermined and/or intentionally generated user error, and performing (e.g., generating) the predetermined user error 110 may be part of the certification process of the software product 104. For example, one or more of the user interactions 108 may be required to be performed to intentionally generate the user error 110. Then for example, the software product 104 may be anticipated to generate the log messages 106 on the logging framework 112 responsive to the intentionally generated user error(s) 110. The certification system 102 may then, for example, certify the software product 104 based on a determination as to whether or not the software product 104 generated the log messages 106 corresponding to the predetermined user error(s) 110 as was anticipated.

The interface 111 may include an interface with the software product 104 configured to receive the user interaction(s) 108 and/or provide the user error 110. For example, the interface 111 may include a graphical user interface associated with the software product 104, whereby a user may interact with the software product 104 via the interface 111 using a user input device 113.

The user input device 113 may include any device configured to interact with the software product 104 and/or the interface 111. The user input device 113 may include, for example, a mouse, keyboard, joystick, microphone, remote control or other input device. According to another example embodiment, the user input device 113 may include a device configured to interact with the software product 104 wirelessly or through one or more networks, such as a mobile phone or a computer on a network system.

According to an example embodiment, the software product 104 may receive the user interaction(s) 108 from the user input device 113 and provide the user error 110 on the interface 111, responsive to the user interaction(s) 108. For example, a user trying to log into the software product 104 may provide an invalid user name and/or password. Then for example, the software product 104 may provide a message (e.g., user error 110) on the interface 111 informing the user of the invalid user name and/or password. The software product 104 may also be configured to generate one or more log messages 106 on a logging framework 112, where the log messages report certain information about the user error 110.

To write the log messages 106 to the logging framework 112, the software product 104 may be configured with a host interface 119A or associated with a code bridge 119B. According to an example embodiment the software product 104 may be developed specifically for operation with the host system and the host product 116. In such embodiments, the software product 104 may be configured with the host interface 119A to write the log messages 106 to the logging framework 112. The host interface 119A may include an application programming interface (API), operating system or library to support requests to and/or from the logging framework 112. For example, the software product 104 may be developed in a version of Java corresponding to the version of Java utilized by the host product 116. Then for example, the host interface 119A may include a logging statement to be inserted into the code of the software product 104 that configures the software product 104 to write the log messages 106 to the logging framework 112.

In other example embodiments, the software product 104 may have been developed as a standalone application and/or for a different system other than the host system. For example, the software product 104 may be previously configured to log messages to another logging framework (e.g., log4j or Common Logging) other than the logging framework 112 (e.g., Java). Then for example, the software product 104 may be configured (e.g., by a software solution provider 124) to operate with the host system using the code bridge 119B. The code bridge 119B may, for example, allow the software product 104 to write the log messages 106 to the logging framework 112 without changing or otherwise modifying the code of the software program 104. For example, the code bridge 119B may route messages generated by the software program 104 to the logging framework 112. In an example embodiment, the code bridge 119B may also format the routed messages into the log format 118.

As referenced above, the software product 104 may be developed by, distributed by, promoted by or otherwise provided by a software solution provider 124. The software solution provider 124 may include a company, organization, individual, system or other provider of the software product 104. For example, the software solution provider 124 may be a software developer that has developed the software product 104 to operate in association with the host product 116.

The host system may, for example, record log messages (e.g., 106) on the logging framework 112 based on events generated by or otherwise associated with the host system. For example, the log messages may be used to determine whether or not the host system is operating properly and/or how to resolve issues that may have arisen. Then for example, the software product 104 may be expected to generate an anticipated error log on the logging component. Then for example, the certification system 102 may compare the anticipated error log to the generated error log and may certify, or otherwise deny certification to, the software product 104 for interaction with the error logging system and/or one or more other components associated with the error logging system.

The host product 116 may have an established base of customers, for example using a CRM system, wherein the software solution provider 124 may develop the software product 104 to work in association with the host product 116, wherein the host product 116 may offer an operating platform with which the customers are already familiar. However as a prerequisite to allowing the software product 104 to operate in association with the host product 116, the software solution 104 may have to be certified by the certification system 102, as referenced above, such that it has been ensured that the product support 114 may support the software product 104 using the logging framework 112 (e.g., similar to how the product support 114 supports the host product 116).

As part of the certification process, the software solution provider 124 may submit or otherwise provide a product profile 126 associated with the software product 104. The product profile 126 may include an outline, summary, abstract or other description of the software product 104. The product profile 126, may include, for example, a field of operation 120 and anticipated log messages 122 associated with the software product 104. In other example embodiments, the product profile 126 may include additional and/or different information as well.

The field of operation 120 may include a technical or other field associated with the software product 104. The field of operation 120, may include an area or subject matter associated with the product. For example, the field of operation 120 may include, finance if the software product 104 is a financial application, or security if the software product 104 was associated with providing security. According to another example embodiment, the field of operation 120 may be associated with one or more aspects of the software product 104, including a particular usage thereof. For example, the software product 104 may be a human resources application, wherein the field of operation 120 may be associated with the security aspect and/or login authentication.

The field of operation 120 may be used to generate or otherwise determine the anticipated log messages 122. The anticipated log messages 122 may include one or more log messages 106 anticipated to be generated by the software product 104 responsive to one or more user interactions 108. For example, a user that clicks on a control (e.g., user interaction 108) of the software product 104 on the interface 111, may receive an 'invalid authority' user error 110. Then for example, responsive to the user interaction 108, the software product 104 may be anticipated to generate a log message (e.g., anticipated log message 122) reading "User does not have proper permissions to perform desired function" on the logging framework 112. According to an example embodiment, the anticipated log messages 122 may be used by the certification system 102 to certify that the software product 104 does operate as intended (e.g., by comparing the anticipated log messages 122 to the log messages 106 actually generated by the software product 102, as will be discussed in greater detail below).

A log engine 128 may determine what log messages (e.g., 106), if any are generated by the software product 104. For example, the log engine 128 may retrieve the log messages 106 from the logging framework 112, wherein the software product 104 may write the log messages 106 on the logging framework 112. Or for example, the log engine 128 may receive the log messages 106 directly from the software product 104, prior to or otherwise corresponding with the generation of the log messages 106 on the logging framework 112.

An interface engine 130 may be configured to determine the user errors 110 generated by the software product 104. For example, the interface engine 130 may log or otherwise determine the user errors 110 from the interface 111. Or for example, the interface engine 130 may receive or determine the user errors 110 directly from the software product 104, independent of the interface 111.

An evaluator 132 may be configured to determine a correspondence level 134 between the log messages 106 and the anticipated log messages 122. As referenced above, the evaluator 132 may compare, for example, the log messages 106 generated by the software product 104 on the logging framework 112 to the log format 118 and/or the anticipated log messages 122 to determine the correspondence level 134. According to another example embodiment, the evaluator 132 in determining the correspondence level 134 may compare the generated log messages 106 to the user error(s) 110.

The correspondence level 134, as just referenced, may indicate a level of correspondence between an operation of the software product 104 to an anticipated or expected operation of the software product 104. For example, the correspondence level 134 may indicate a level of correspondence between the user interaction(s) 108, the user error 110 provided in response to the user interaction(s) 108, the log messages 106 actually generated by the software product 104 corresponding to the user error 110, and the anticipated log messages 122 anticipated to be generated by the software product 104 responsive to the user interaction(s) 108 and/or user error 110.

A certification engine 136 may determine whether or not to certify the software product 104. For example, the certification engine 136 may compare the correspondence level 134 to a threshold correspondence level 138. The threshold correspondence level 138 may be a minimum level of correspondence that the software product 104 is to satisfy to be certified to operate in association with the host product 116 and/or the logging framework 112. Then, for example, if the certification engine 136 determines that the correspondence level 134 is greater than or equal to the threshold correspondence level 138, the certification engine 136 may certify the software product 104 for operation with the logging framework 112 and/or host product 116, as discussed above.

The certification system 102 of FIG. 1, may be used to evaluate situations where the compatibility of two or more products or systems are in question. For example, a first product (e.g., host product 116) may operate using a particular system or mechanism (e.g., logging framework 112) and a second product (e.g., software product 104) may be configured to operate consistently with the system or mechanism used by the first product. Then, based on an anticipated performance and actual performance of the second product, the certification system 102 may certify (or otherwise deny certification) to the second product for operation with the first product and/or system or mechanism.

Figure 2:
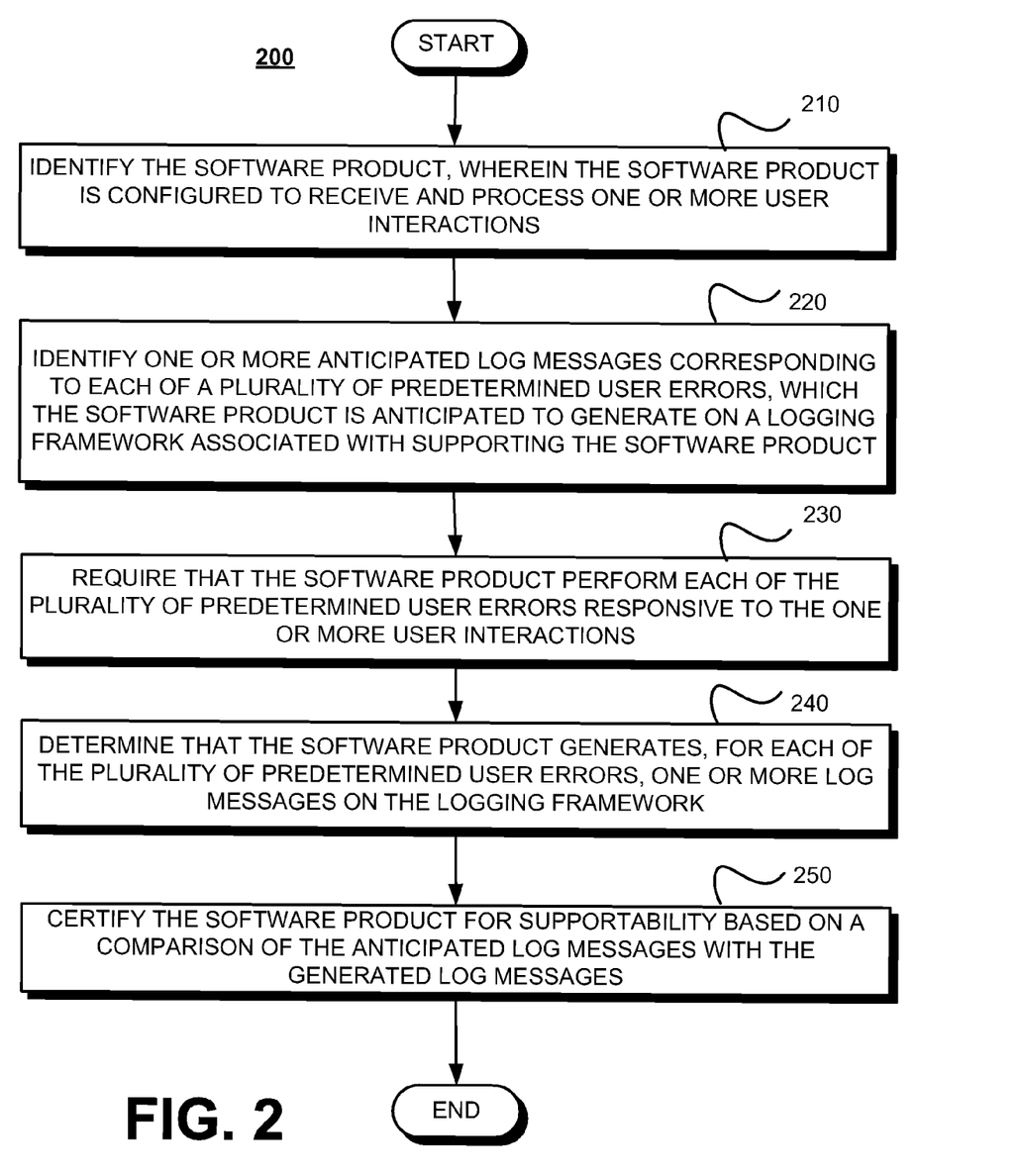
FIG. 2 is a flowchart illustrating example operations of the system of FIG. 1, according to an example embodiment.

FIG. 2 is a flowchart 200 illustrating example operations of the system of FIG. 1, according to an example embodiment. More specifically, FIG. 2 illustrates an operational flow 200 representing example operations related to the certification system 102.

After a start operation, the software product may be determined, wherein the software product is configured to receive and process user interactions (210). For example, the software product 104 may be identified, wherein the software product 104 is configured to receive and process the user interactions 108.

One or more anticipated log messages corresponding to each of the predetermined user errors which the software product is anticipated to generate on a logging framework associated with supporting the software product may be identified (220). For example, the anticipated log messages 122 may be identified, wherein the software product 104 is anticipated to generate the anticipated log message 122 on the logging framework 112.

The software product may be required to perform each of the plurality of predetermined user errors responsive to the one or more user interactions (230). For example, the software product 104 may be required to perform each of the user error(s) 110 responsive to the one or more user interaction(s) 108. Then for example, the certification system 102 may enforce the requirement.

It may be determined that the software product generates, for each of the plurality of predetermined user errors, one or more log messages on the logging framework (240). For example, the log engine 128 may determine that, or whether, the software product generates the log messages 106 on the logging framework 112. Then for example, the evaluator 132 may determine whether the log messages 106 were generated for each of the plurality of user errors 110, wherein the interface engine 130 may determine the user errors 110.

The software product may be certified for supportability based on a comparison of the anticipated log messages with the generated log messages (250). For example, the certification engine 136 may certify the software product 104 for supportability based on a comparison of the anticipated log messages 122 to the generated log messages 106.

Figure 3:
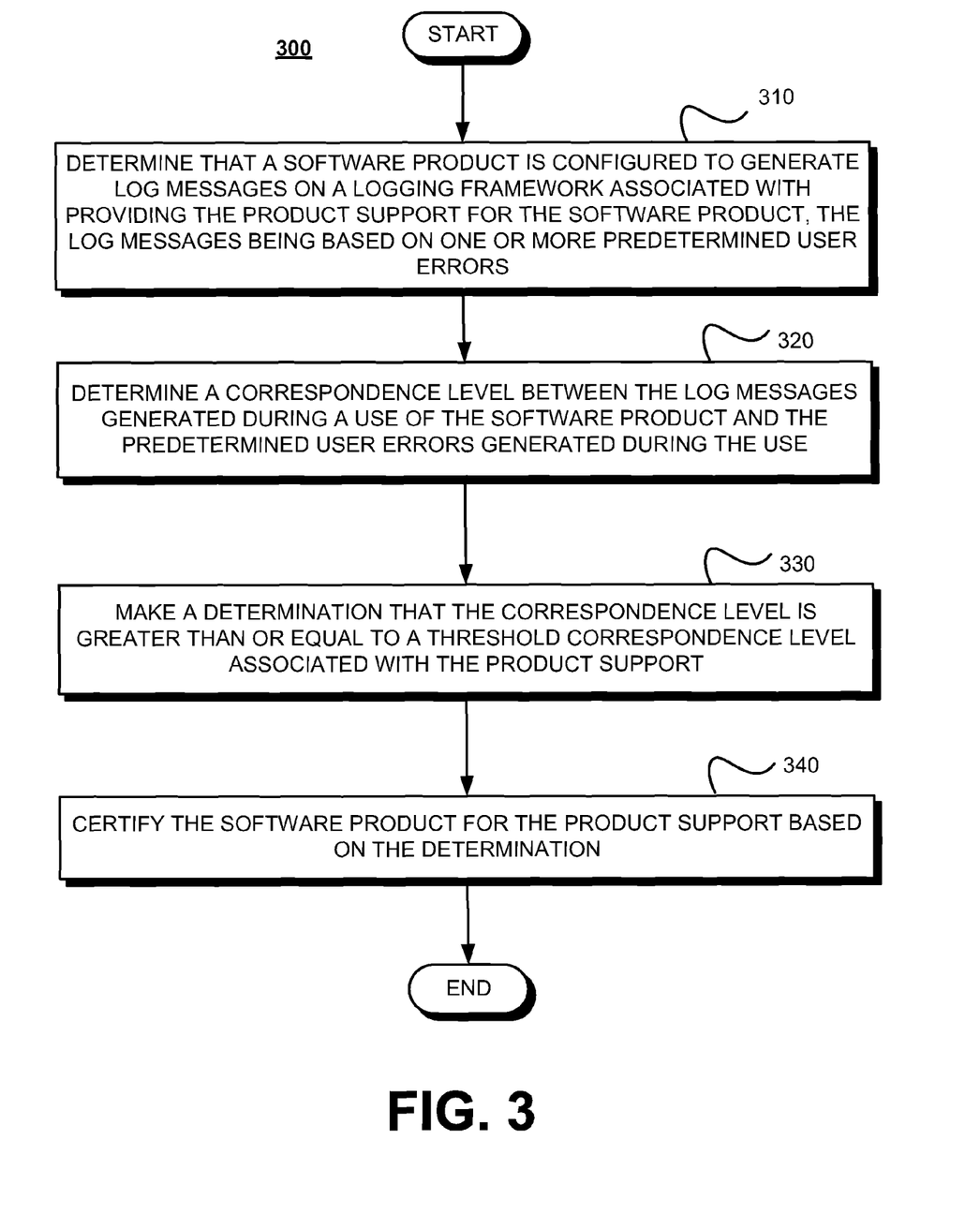
FIG. 3 is a flowchart illustrating example operations of the system of FIG. 1, according to an example embodiment.

FIG. 3 is a flowchart 300 illustrating example operations of the system of FIG. 1, according to an example embodiment. More specifically, FIG. 3 illustrates an operational flow 300 representing example operations related to the certification system 102.

After a start operation, it may be determined that a software product is configured to generate log messages on a logging framework associated with providing the product support for the software product, the log messages being based on one or more predetermined user errors (310). For example, the log engine 128 may determine that the software product 104 is configured to generate the log messages 106 on the logging framework 112 associated with the product support 114, wherein the log messages 106 may be based on the user errors 110.

A correspondence level may be determined between the log messages generated during a use of the software product and the predetermined user errors generated during the use (320). For example, the evaluator 132 may determine the correspondence level 134 between the log messages 106 generated during a use of the software product 104 and the user errors 110 generated during the use.

A determination may be made that the correspondence level is greater than or equal to a threshold correspondence level associated with the product support (330). For example, the certification engine 136 may determine that the correspondence level 134 is greater than or equal to the threshold correspondence level 138 associated with the product support 114.

The software product may be certified for the product support based on the determination (340). For example, the certification engine 136 may certify the software product 104 for the product support 114 based on the determination.

FIG. 4 is a block diagram of an example logging framework 112 of FIG. 1, according to an example embodiment. The logging framework 112 of FIG. 4, may include for example a number of columns associated with an example log format (e.g., log format 116 of FIG. 1), each column corresponding a different data field to be included in one or more of the log messages 106 (wherein each row 106 may correspond to a log message). It should be understood that the contents and/or format of the fields included in the example of FIG. 4, are exemplary only and that additional and/or different fields and/or formats may exist in various other embodiments.

A severity field 402 may indicate a severity of the log message and/or system event associated with the log message. For example, in the example of FIG. 4, each of the log messages 106 may be informational log messages, except log message 106A. Log message 106A may be generated as a result of an error occurring with a system or product. The log message 106 may also include one or more visual and/or audio indicators indicating the severity of the error. For example, yellow may indicate medium severity and red may indicate a higher severity. In other example embodiments, additional and/or different severity assessments may be used.

The date field 404 and time field 406 may indicate the date and time of the user interaction causing the log message 106, the system event generated as a result of the user interaction, and/or the generation of the log message 106 on the logging framework 112. For example, the first log message 106 may have been logged by the logging framework on Nov. 7, 2006 at 5:10 pm and 54 seconds and 796 hundredths of a second.

The message field 408 may indicate the content of the message generated, indicating the user interaction and/or system response or event occurring in response to or otherwise associated with the user interaction. For example, in the sixth log message 106, the system may 'LOOKUP:JMX', which may correspond for example to a user search for "JMX" and/or a system response to some other use interaction.

The category field 410 may indicate a category associated with each log message 106. The category, for example, may correspond to a folder and/or subdirectory accessed by the program generating the log message. Or for example, in other example embodiments, the category may correspond to a broader field such as 'log in', 'finance' or 'assignments.'

The location field 412 and the application field 414 may indicate the location of the machine on which the log message 106 was generated and the application on the machine causing the log message 106, respectively. For example, the location may correspond to an internet protocol (IP), media access control (MAC), or other network address of the machine where a user interaction was received. Then for example, the application field 414 may indicate which application on the identified machine was being used that generated the log message 106.

According to an example embodiment, the logging framework 112 may include one or more other tools for organizing and/or sorting through the log messages 106, such as filters 416. The filters 416 may for example search through the log messages 106 for any log messages matching a set of fields as specified by a user (or product support 114).

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A computer-implemented method for certifying a software product for supportability comprising:
   identifying, by at least one processor of a computer system, the software product, wherein the software product is configured to receive and process one or more user interactions;
   identifying, by at least one processor of the computer system, one or more anticipated log messages corresponding to each of a plurality of predetermined user errors, which the software product is anticipated to generate on a logging framework associated with supporting the software product;
   requiring, by at least one processor of the computer system, that the software product perform each of the plurality of predetermined user errors responsive to the one or more user interactions;
   determining, by at least one processor of the computer system, that the software product generates, for each of the plurality of predetermined user errors, one or more log messages on the logging framework; and
   certifying, by at least one processor of the computer system, the software product for supportability based on a comparison of the anticipated log messages with the generated log messages.

2. The method of claim 1 wherein identifying a software product comprises identifying a field of operation associated with the one or more user interactions.

3. The method of claim 2 wherein identifying a software product comprises receiving the field of operation from a software solution provider associated with the software product.

4. The method of claim 1 wherein identifying one or more anticipated log messages comprises determining the predetermined user errors based on the one or more log messages generated on the logging framework.

5. The method of claim 1 wherein identifying one or more anticipated log messages comprises determining that the software product is configured to generate the one or more anticipated log messages based on link between the software product and the logging framework, wherein the link comprises a code bridge and a host interface.

6. The method of claim 1 wherein the requiring comprises determining that the software product generates the predetermined user errors responsive to one or more of the user interactions.

7. The method of claim 1 wherein determining that the software product generates one or more log messages on the logging framework comprises determining that the log messages generated on the logging framework correspond to the plurality of predetermined user errors provided via an interface associated with the software product.

8. The method of claim 1 wherein certifying the software product for supportability comprises determining that the predetermined user errors generated on the logging framework are consistent with a log format of a host product associated with the logging framework.

9. The method of claim 1 wherein certifying the software product for supportability comprises:
   determining a correspondence level between the anticipated log messages and the generated log messages; and
   determining that the correspondence level is greater than a threshold correspondence level associated with certifying the software product for supportability.

10. A computer-implemented method for certifying a software product for product support the method comprising:
    determining, by at least one processor of a computer system, that the software product is configured to generate log messages on a logging framework associated with providing the product support for the software product, wherein the log messages are based on one or more predetermined user errors;
    determining, by at least one processor of the computer system, a correspondence level between the log messages generated during a use of the software product and the predetermined user errors generated during the use;
    determining, by at least one processor of the computer system, that the correspondence level is greater than or equal to a threshold correspondence level associated with the product support; and
    certifying, by at least one processor of the computer system, the software product for the product support based on the determination that the correspondence level is greater than or equal to the threshold correspondence level.

11. The method of claim 10 wherein determining that a software product is configured to generate log messages on the logging framework comprises determining that the software product is configured to generate the log messages based on a log format of a host product associated with the logging framework.

12. The method of claim 10 wherein determining that a software product is configured to generate log messages on the logging framework comprises determining that software product is configured to generate the log messages on the logging framework via a code bridge associated logging framework.

13. The method of claim 10 wherein determining that a software product is configured to generate log messages on the logging framework comprises determining that the predetermined user errors are based on a product profile associated with the software product.

14. The method of claim 10 wherein determining that a software product is configured to generate log messages on the logging framework comprises determining that the software product is configured to generate the log messages on the logging framework based on one or more the use of the software product, wherein the use comprises one or more user interactions.

15. The method of claim 14 wherein the one or more predetermined user errors correspond to one or more of the user interactions.

16. The method of claim 10 wherein determining a correspondence level between the log messages generated during a use of the software product and the user errors generated during the use comprises determining the correspondence level between the log messages generated during the use of the software product and one or more anticipated log messages that are anticipated to be generated during the use.

17. A system for determining a supportability of a software product in conjunction with a host product, the system comprising:
    a memory storing executable instructions; and
    at least one processor configured to execute the stored instructions to implement:
        a log engine configured to retrieve log messages generated by the software product on a logging framework associated with the host product, wherein the log messages are anticipated to correspond to one or more predetermined user errors determined by the software product;
        an interface engine configured to determine the predetermined user errors associated with the software product;
        an evaluator configured to determine a correspondence level associated with the software product based on a level of correspondence between the predetermined user errors and the log messages; and
        a certification engine configured to determine the supportability of the software product based on a comparison of the correspondence level with a threshold correspondence level.

18. The system of claim 17 wherein the evaluator is configured to determine the correspondence level based on a level of correspondence between the log messages generated by the software product and one or more anticipated log messages that are anticipated to be generated by the software product.

19. The system of claim 18 wherein the evaluator is configured to determine the anticipated log messages based on a product profile associated with the software product.

20. The system of claim 17 wherein the evaluator is configured to determine the correspondence level based on a level of correspondence between the log messages generated by the software product and a log format associated with the host product.

* * * * *